United States Patent [19]

Stritzel

[11] Patent Number: 4,885,958

[45] Date of Patent: Dec. 12, 1989

[54] CAM ACTION PIN LOCKING MEANS FOR A DIFFERENTIAL

[75] Inventor: Gene A. Stritzel, Rochester, N.Y.

[73] Assignee: D-K Gleason, Inc., Rochester, N.Y.

[21] Appl. No.: 250,689

[22] Filed: Sep. 28, 1988

[51] Int. Cl.[4] .............................................. F16H 1/38
[52] U.S. Cl. ................................................... 74/715
[58] Field of Search ........................... 74/710, 713, 715

[56] References Cited

U.S. PATENT DOCUMENTS

| | | | |
|---|---|---|---|
| 824,526 | 6/1906 | Coffin | 213/156 |
| 1,544,363 | 6/1925 | Alden | 74/713 |
| 1,721,535 | 7/1929 | Taub | 74/713 |
| 2,192,088 | 2/1940 | Lewis | 184/11 |
| 2,408,926 | 10/1946 | Griffith | 74/713 |
| 2,451,035 | 10/1948 | Marsilius | 77/62 |
| 2,558,814 | 7/1951 | Briney | 77/62 |
| 2,859,641 | 11/1958 | Gleasman | 74/715 |
| 3,715,936 | 2/1973 | Jones | 74/713 |
| 3,837,236 | 9/1974 | Kagata | 74/711 |
| 3,884,096 | 5/1975 | Gleasman | 74/715 |
| 3,902,237 | 9/1975 | Benjamin | 29/407 |
| 4,191,071 | 3/1980 | Gleasman et al. | 74/715 |
| 4,491,035 | 1/1985 | Gleasman et al. | 74/715 |
| 4,495,835 | 1/1985 | Gleasman | 74/715 |
| 4,512,211 | 4/1985 | Stritzel | 74/745 |
| 4,722,244 | 2/1988 | Tsuchiya et al. | 74/713 |
| 4,724,721 | 2/1988 | Gleasman et al. | 74/715 |
| 4,781,079 | 11/1988 | Takahashi | 74/711 |

Primary Examiner—Dirk Wright
Attorney, Agent, or Firm—Stonebraker, Shepard & Stephens

[57] ABSTRACT

A differential gear assembly of the type including transfer gears for dividing torque between two axles. The transfer gears are each mounted on a pin which is journaled in housing by aligned bores. Cam action means are provided which restricts rotation of pin.

5 Claims, 4 Drawing Sheets

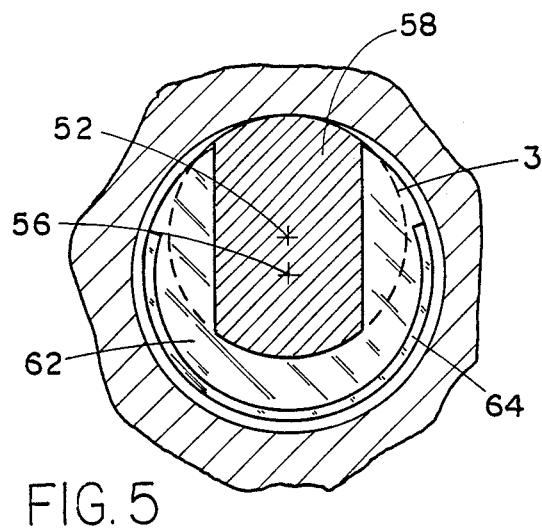
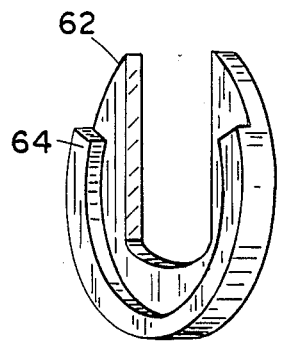
FIG. 5  FIG. 6
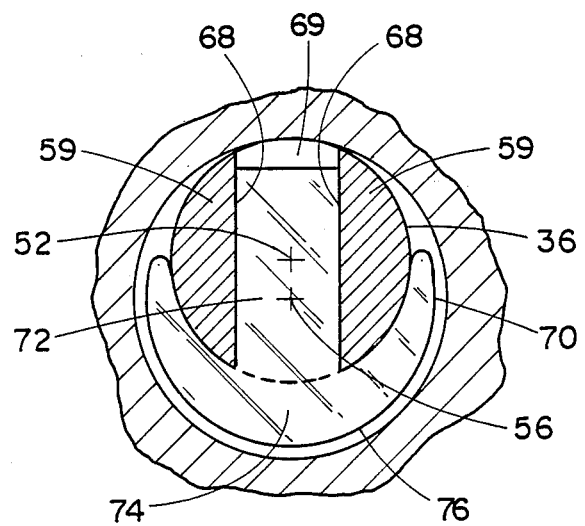
FIG. 7

CAM ACTION PIN LOCKING MEANS FOR A DIFFERENTIAL

TECHNICAL FIELD

The present invention relates to vehicle differential gear assemblies of the type which include transfer gears for dividing torque between two axle ends, and specifically, to the mounting of such transfer gears.

BACKGROUND ART

A differential assembly of the type contemplated for the present invention is generally of the design shown in U.S. application No. 2,859,641 (GLEASMAN). This patent is incorporated herein by reference to the extent necessary to provide specific details of the structure of the differential assembly.

This type of differential includes a rotatable gear housing, a pair of drive axles received in bores formed in the sides of the housing, and a differential gear arrangement mounted within a main body portion of the housing for driving the axles. The gear housing body portion includes a flange formed at one end for mounting a ring gear or other means for providing power input to the differential from the drive shaft of the vehicle in a conventional manner. The gear housing is provided with a cap at its other end which may be formed as an integral part of the housing or may be removably secured to the housing.

The gear arrangement which is referred to as a "crossed-axis compound planetary gear complex" includes a pair of helical worm or side gears coupled to each axle end, together with so called transfer gears associated with each of the side gears and in mesh with each other for transferring and dividing torque between the axle ends. The transfer gears are mounted in pairs within slots, or windows, formed in the main body portion of the gear housing, and each transfer gear of a pair rotates on an axis of rotation that is substantially perpendicular to the axis of rotation of the side gears and gear housing.

The transfer gears are in reality combination gears, i.e., the middle portion of each gear constitutes a worm wheel portion while the outer ends of the gear are formed with integral spur gear portions. The gear arrangement is such that, for any given pair of combination gears, the worm wheel portion of a first combination gear meshes with one side gear while the worm wheel portion of a second combination gear meshes with the other side gear, and the spur gear portions of the respective combination gears mesh with each other.

The transfer gears are each mounted to the gear housing body by a pin which fits into a pair of axially aligned bores in the housing. Each pin has been allowed to freely rotate about its axis within these bores. This free rotation can increase wear between the pin and bores which, unless otherwise accomodated, may affect the prolonged performance and durability of the differenetial. Under special circumstances, the pins may be weakened by circumferential score marks developed where the pin under deflection contacts the sharp edges of the housing bores.

SUMMARY OF THE INVENTION

The present invention is directed to restricting rotation of the pins on which the transfer gears are mounted and thus avoid o minimize the problems of the prior art. The present invention solves these problems by providing cam action means associated with one end of the pin which is simple in design and construction, reliable, easy to assembly and is low cost to manufacture.

In one version of the present invention, an eccentric counter bore is placed adjacent to one of the pin mounting bores. A washer having a generally circular outer shape is provided which has a slot designed to mate with one end of the pin in the counter bore. The center of the washer coincides with the center of the counter bore. As the pin rotates, the side of the washer wedges against the side of the counter bore to restrict further rotation of the pin.

DESCRIPTION OF THE DRAWINGS

FIG. 5 is a view similar to FIG. 3 illustrating an alternate embodiment of the cam action means used to restrict rotation of the pin;

FIG. 6 is a perspective view of the washer illustrated in FIG. 5;

FIG. 7 is a view similar to FIG. 3 illustrating yet another embodiment of the cam action means used to restrict rotation of the shaft;

BEST MODES FOR CARRYING OUT THE INVENTION

Figure 1:
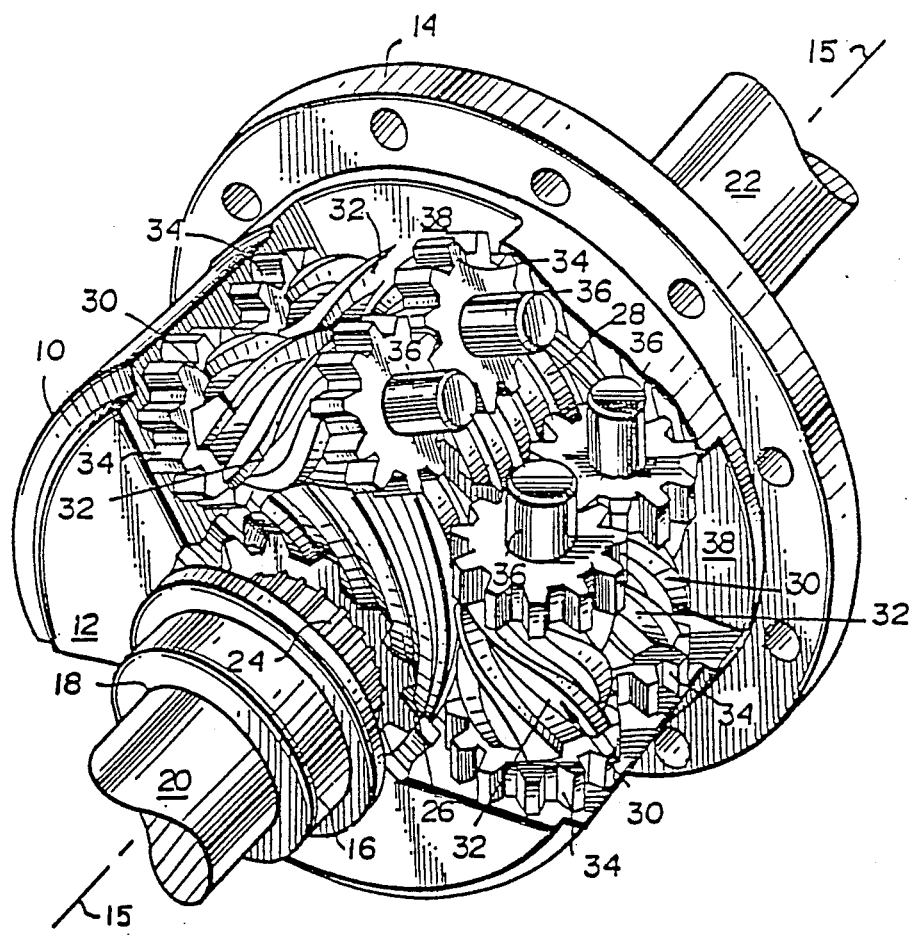
FIG. 1 is a perspective view of a differential gear assembly made in accordance with the present invention with parts broken away in sections to show the internal gear structure.

Referring to FIG. 1, a known differential gear assembly generally similar to the differential gear assembly of this invention includes a differential gear housing 10 which includes an end cap 12 at one end and a flange 14 at the other end. The flange 14 is adapted to mount a ring gear (not shown) for receiving power input from the drive train of a vehicle in a conventional manner. The differential gear housing 10 also includes a pair of spaced apart trunnions 16 (only one of which is shown) which are adapted to receive bearings by which the differential housing is rotatively mounted inside a conventional axle housing.

Trunnions 16 receive in respective bores 18 axle ends 20 and 22 which extend into engagement with the gear complex inside the main body portion of the housing. In particular, axle shaft ends 20 and 22 include external splines 24 which engage mating splines of side gears 26 and 28, respectively. The side gears are known to be of the worm or helical gear type.

Each side gear 26 or 28 meshes with three combination gears 30 which are arranged at 120° (degree) intervals about the periphery of the associated side gear, and are arranged generally tangent to, and in engagement with the pitch surface of the side gear. It is understood with reference to FIG. 1, that only two of the three combination gears associated with each side gear 26 or 28 are shown. Each of these combination gears is formed with a middle portion which may be defined by an hourglass worm wheel portion 32 and integral end portions which may be defined by spur gear portions 34. Since it would also be possible to substitute helical gearing for either the worm wheel portion on spur gear portions, the terms worm wheel and spur gear will be used hereinafter only to distinguish combination gear portions from each other and are not intended to be limiting as to gear type.

Each side gear meshes with the worm wheel portions 32 of three associated combination gears 30. The spur gear portions 34 of each combination gear associated with one side gear mesh with the spur gear portions of adjacent combination gears associated with the other of the two side gears. It is this arrangement, sometimes termed a "crossed-axis compound planetary gear complex" which transfers and divides torque between axle shaft ends 20 and 22.

Each combination gear 30 is mounted for rotation about a pin or shaft 36, the ends of which extend beyond the gear and serve to mount the gear within the main body portion of the gear housing 10. Shafts 36 also define respective axes of rotation for the combination gears which extend substantially perpendicular to the common axis of rotation 15 of the side gears and axle ends. Since each of the three combination gears 30 associated with one side gear 26 or 28 is paired with a combination gear associated with the other side gear, the gear housing 10 is formed with three peripherally arranged "windows" or slots 38 extending inwardly from the periphery of the housing, each window or slot 38 receiving and mounting one pair of combination gears.

Each pair of combination gears 30 received in respective windows 38 formed in the housing at least partially defines a separate gear train for operatively connecting side gears 26 and 28 which are rotatively coupled to respective axle ends 20 and 22. It may be understood from the above description of the differential gear assembly of FIG. 1 that three separate gear trains are defined for operatively connecting the side gears, each train being at least partially defined by a combination gear pair received in one of the three windows 38 formed in gear housing 10.

Figure 2:
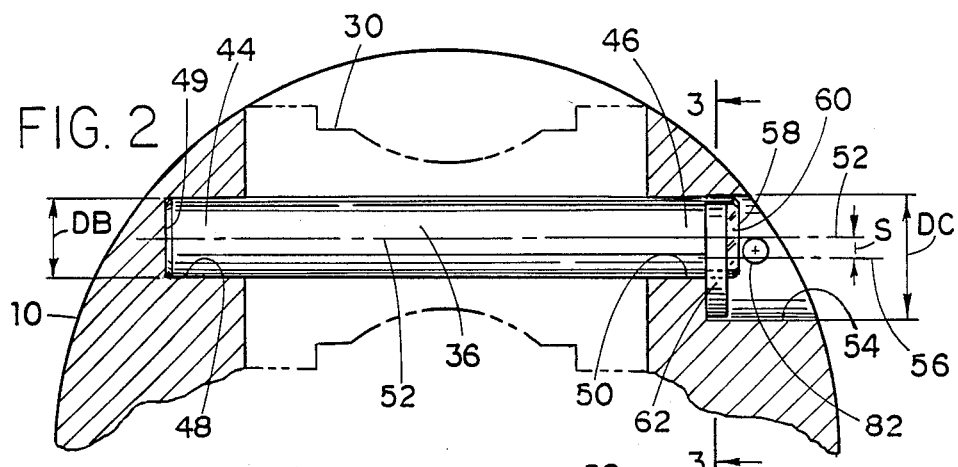
FIG. 2 is an enlarged partial cross sectional view of the differential gear assembly of FIG. 1 illustrating how a single combination gear is mounted therein.

Referring to FIG. 2, there is illustrated a partial cross sectional view of the housing 10 illustrating how one of the combination gears 30 (shown in phantom lines) is mounted therein. For the purpose of clarity only one combination gear 30 will be described in detail, it being understood that the other combinations gears are similarly mounted. The combination gear 30 is rotatably mounted on shaft or pin 36 which has a pair of ends 44, 46 which are journaled within a pair of axially aligned bores 48, 50 in housing 10. Bores 48, 50 each have a diameter DB and a common center line 52. A counter bore 54 is provided in housing 10 which extends from the outer surface of housing 10 and connects with bore 50. Counter bore 54 has a diameter DC and a center line 56 which is offset from center line 52 a distance S. Diameter DC of counter bore 54 is larger than the diameter DB of bores 48, 50 such that the entire circumference of bore 50 falls within counter bore 54. The end 46 of pin 36 has a projection 58 which extends into counter bore 54. The projection 58 is shaped to provide an outer cross sectional configuration smaller than the diameter of pin 36 and a pair of parallel flat mounting surfaces 60. In the particular embodiment illustrated, projection 58 has a generally oblong configuration (see FIG. 3). A C-type washer 62 is located at the end 46 of pin 36 in counter bore 54. Washer 62 has a slot 66 which has a configuration that corresponds and mates with the surfaces 60 of projection 58 such that when the pin 36 rotates, the washer 62 will rotate with the pin 36. It is to be understood that the projection 58 and slot 66 take any desired shape so long as the washer 62 rotates with pin 36. The outer configuration of washer 62 is substantially circular and has a diameter DW which is equal to or greater than the diameter DB of bore 52. The center of washer 62 coincides with center line 56 of counter bore 54.

Figure 3:
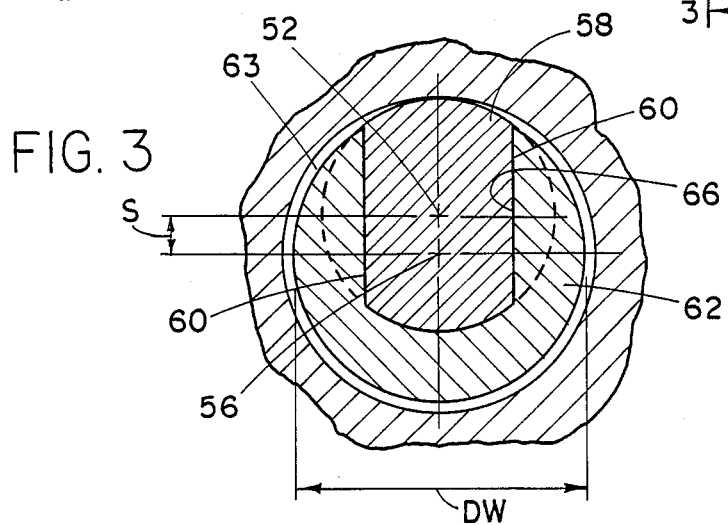
FIG. 3 is an enlarged cross sectional view of the pin and housing as taken along lines 3—3 of FIG. 2.

Referring further to FIG. 3, there is illustrated a side cross sectional view of pin 36 and washer 62 within housing 10. This view illustrates the pin 36 and washer 62 after it has been initially assembled within housing 10. Since the center of washer 62 and the center line 56 of counter bore 54 are offset with respect to center line 52 of pin 36 and bores 48, 50 through distance S, the washer 62 with pin 36 can be assembled in housing 10 in only one general orientation. The combination gear 30, washer 62 and pin 36 are assembled by simply placing pin 36 through bore 50, combination gear 30 and bore 48, the shoulder 49 (see FIG. 2) of bore 48 preventing any further axial movement of pin 36. The washer 62 is mounted on projection 58 of pin 36, and together, the washer 62 and pin 36 are aligned in counter bore 54 as illustrated in FIG. 2. After the pin 36 and washer 62 are properly seated within bores 48, 50, and counter bore 54, respectively, a retaining pin 82 is inserted in housing 10 to secure the pin and washer within the housing.

Figure 4:
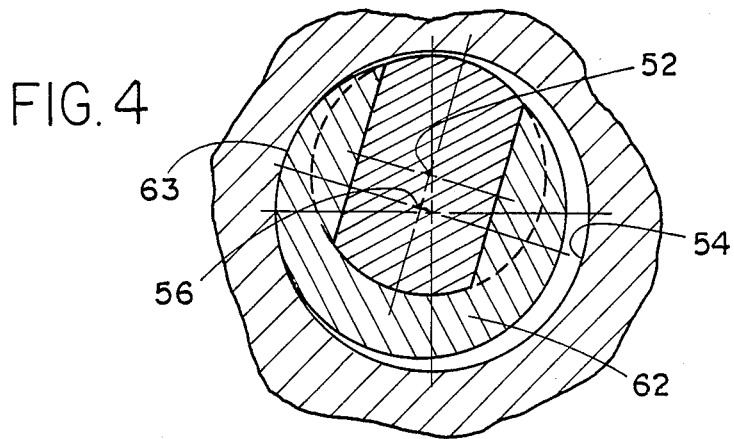
FIG. 4 is a view similar to FIG. 3 which illustrates how the cam action means restrict rotation of the pin.

FIG. 4 illustrates how the present invention restricts rotation of pin 36. Rotation of pin 36 results in the eccentric rotation of washer 62 about center line 52 of the pin. As the pin 36 and washer 62 rotate together about center line 52, the side 63 of the washer 62 wedges against the inside of counter bore 54, restricting further rotation of pin 36. Thus, it can be seen that the washer 62, pin 36 and counter bore 54 provide cam action means for restricting rotation of the pin 36. The amount of rotation that will occur is dependent upon the relative sizes (i.e. diameters) of counter bore 54 and washer 62, and the amount of eccentricity of counter bore 54 with respect to bore 50. Preferably, values for these items are selected so that the amount of rotation through which the pin 36 can rotate before it is restricted from any further rotation is less than about 10°. Most preferably, no greater than 5°.

In the preferred form of the present invention, as illustrated in FIG. 3 and 4, the outer periphery of washer 62 is substantially circular in configuration. However, the outer configuration of washer 62 can take other shapes as long as the above-described cam action is provided to restrict further rotation of pin 36.

Referring to FIGS. 5 and 6, there is illustrated a modified form of washer 62. In this particular embodiment, washer 62 is provided with a upstanding flange 64 which extends along a portion of the outer periphery of washer 62. Flange 64 increases the contact surface area between the washer 62 and counter bore 54.

Referring to FIG. 7, there is illustrated another modified form of the present invention. In this embodiment in place of a single projection 58, a pair of spaced projections 59 are provided. Projections 59 have a pair of parallel mating surfaces 68 which form a slot 69 therebetween. A T-shaped washer 70 is provided which has a stem 72 which mates with surfaces 68, and a cap portion 74. Cap portion 74 has an outer mating surface 76 which when rotated about center line 52 wedges against the side of counter bore 54 to restrict further rotation of pin 36.

As can be seen from the foregoing description, the present invention restricts rotation of the pins used to mount combination gears in a differential which is simple in operation and construction, reliable, easy to assemble and is low cost to manufacture.

Figure 8:
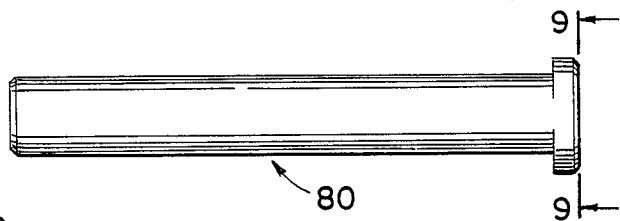
FIG. 8 is a front elevational view of a modified pin made in accordance with the present invention.
Figure 9:
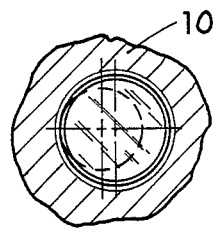
FIG. 9 is an end view of the pin of FIG. 8 as mounted within the gear housing.

Various modifications may be made without departing from the scope of the present invention. For example, the washer 62 may have any thickness which adequately restricts rotation and is expedient to manufacture. Additionally, in the embodiments illustrated, washer 62 has been shown a separate and discreet element. However, the present invention is not so limited. If desired, the washer 62 may be integrally formed as a part of pin 36. Referring to FIGS. 8 and 9, there is illustrated a pin 80 wherein the washer is integrally formed as a part of the pin 80 so as to provide a single piece. Further, the cam action means for restricting rotation of pin 36 need not be associated with bore 50 which the pin 36 is first passed through. A counter bore smaller in diameter than bore 48 may be provided adjacent bore 48. This smaller bore would be offset with respect to the center line of bore 48. A circular projection would then be provided at the end 44 which would mate within the smaller counter bore. As pin 36 is rotated, a caming action will occur to restrict rotation of pin 36. The scope of the present invention being defined by the attached claims.

What is claimed is:

1. A differential gear assembly of a type including a rotatable gear housing having means for receivable axle ends, substantially aligned side gears disposed within said housing for respective rotation with said axle means about a common axis, a transfer gear for operatively connecting said side gears mounted for rotation about a pin having a pair of ends, said pin being journaled within said housing by a pair of axially aligned bores in said gear housing, characterized by cam action means for restricting rotation of said pin within said bores, said cam action means including a counter bore formed in said housing and connected with one of said bores, said counter bore having a center line spaced a distance from the center line of said bores.

2. A differential gear assembly as defined in claim 1 further characterized by a washer which mates with one end of said pin for rotation therewith mounted in said counter bore, said washer having an outer engaging surface having a configuration such that it will wedge against said counter bore when said pin is rotated.

3. A differential gear assembly as defined in claim 2 wherein said one end of said pin has a projection having two flat mating surfaces, said washer having a generally C shape configuration which mates and engages said projection.

4. A differential gear assembly as defined in claim 2 wherein said one end of said pin has a pair of spaced projection which form a slot therebetween, said washer having a generally T-shape configuration defined by a stem portion and cap portion, said stem portion mating with said slot, said cap portion having an outer configuration such that it will wedge against said counter bore when said pin is rotated.

5. A differential gear assembly as defined in claim 2 wherein said pin and said washer are integrally formed as a single piece.

* * * * *